(12) United States Patent
George

(10) Patent No.: US 8,474,359 B2
(45) Date of Patent: Jul. 2, 2013

(54) GRAPE CUTTER

(75) Inventor: Colleen C. George, Feasterville, PA (US)

(73) Assignee: Colleen Clinger George, Morrisville, PA (US)

( * ) Notice: Subject to any disclaimer, the term of this patent is extended or adjusted under 35 U.S.C. 154(b) by 179 days.

(21) Appl. No.: 12/896,706

(22) Filed: Oct. 1, 2010

(65) Prior Publication Data

US 2011/0078906 A1    Apr. 7, 2011

Related U.S. Application Data

(60) Provisional application No. 61/272,513, filed on Oct. 1, 2009.

(51) Int. Cl.
*B26B 29/06* (2006.01)
(52) U.S. Cl.
USPC .................. 83/745; 83/761; 83/932; 30/124; 30/289; 269/287
(58) Field of Classification Search
USPC .................. 83/743, 745, 761–764, 932, 465, 83/466.1; 30/289, 290, 293, 124, 114; 269/287–295; D7/673, 674
See application file for complete search history.

(56) References Cited

U.S. PATENT DOCUMENTS

| | | | |
|---|---|---|---|
| 1,098,941 A * | 6/1914 | Collins | ........................... 83/762 |
| 3,347,296 A | 10/1967 | Rothman | |
| 4,253,650 A * | 3/1981 | Kuzio | .......................... 269/87.2 |
| 4,550,636 A | 11/1985 | Josselson et al. | |
| 4,948,106 A | 8/1990 | Popeil et al. | |
| 5,527,022 A | 6/1996 | Gibson | |
| D377,297 S | 1/1997 | Thompson | |
| 5,626,067 A | 5/1997 | Lothe | |
| 5,819,629 A | 10/1998 | Sarich | |
| 5,924,352 A * | 7/1999 | Lothe | .............................. 83/761 |
| 5,946,998 A * | 9/1999 | Thompson | ...................... 83/870 |
| 7,216,574 B2 | 5/2007 | Woods | |

* cited by examiner

*Primary Examiner* — Phong Nguyen
(74) *Attorney, Agent, or Firm* — Litman Law Office LTD

(57) ABSTRACT

The grape cutter includes a base and a cover overlying the base. The base includes a recess adapted to hold a plurality of foodstuffs therein. The cover also includes a recess adapted to accommodate and hold the foodstuffs between the cover and the base. Both the base and the cover include a respective surrounding flange that define a slicing gap when assembled so that a user may slide a knife through the slicing gap to cut the foodstuffs. The slicing gap may be adjusted to accommodate foodstuffs of various sizes.

5 Claims, 6 Drawing Sheets

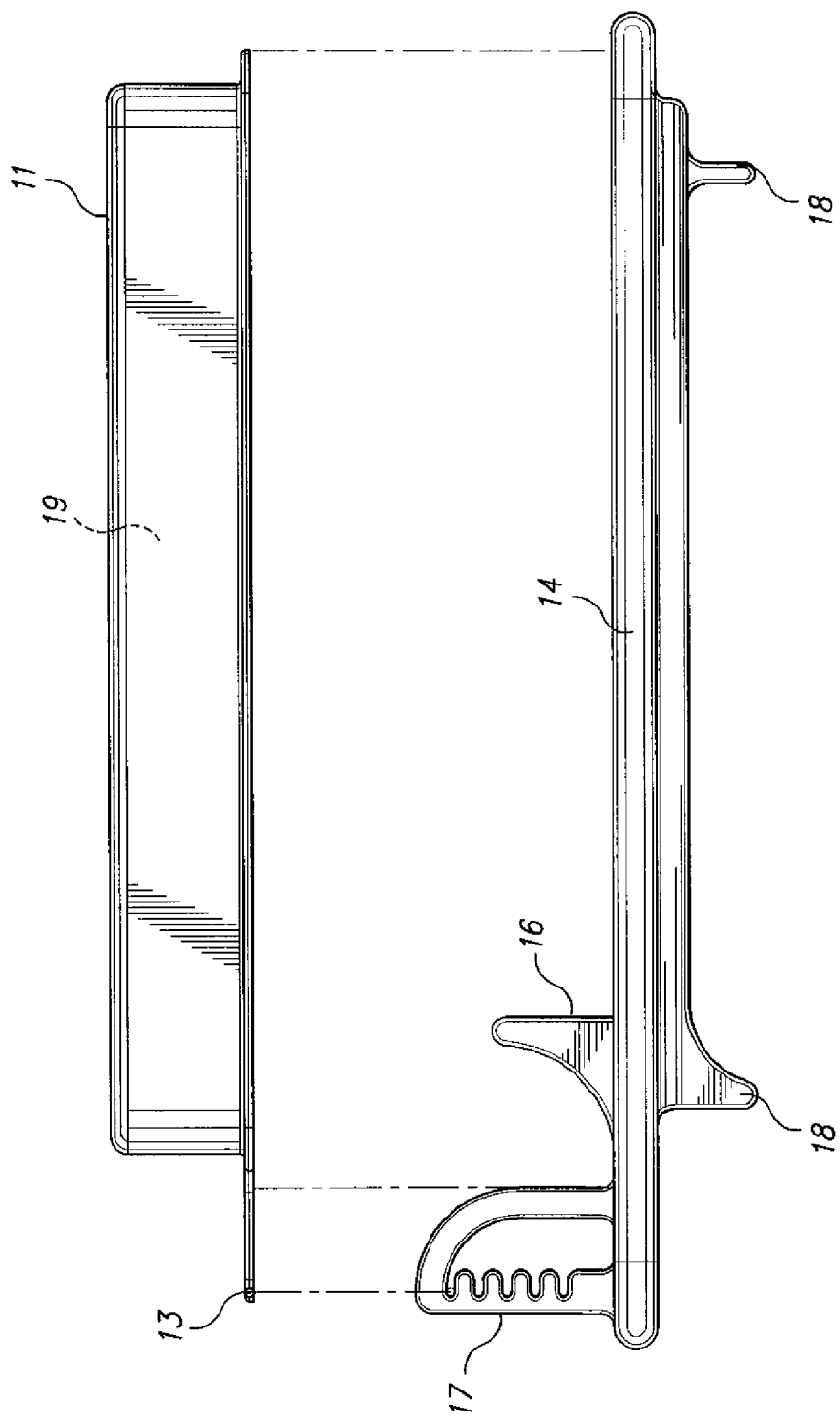

GRAPE CUTTER

CROSS-REFERENCE TO RELATED APPLICATION

This application claims the benefit of U.S. Provisional Patent Application Ser. No. 61/272,513, filed Oct. 1, 2009.

FIELD OF THE INVENTION

The present invention relates to kitchen utensils, and more particularly to a grape cutter for simultaneous slicing of a plurality of grapes and other consumables in one cutting stroke.

DESCRIPTION OF THE RELATED ART

Cooking is a passionate endeavor for many besides professional chefs. Since food consumption is basic to survival, cooks of all skill levels strive to make it an enjoyable experience through various techniques and combination of spices.

One of the most demanding aspects to cooking lies in prepping the ingredients for a particular recipe. This requires tedious and time consuming chopping and slicing of vegetables, fruits and meat that can be relatively tiresome and dangerous if one is not careful with a knife, especially in a restaurant environment where food must be prepared in mass quantities. Some ingredients require more effort or time due to the special handling needs and/or presentation. Food is enjoyed with the eyes as well as the mouth. For example, if it is desired to cut grapes in half, it generally requires the cook to slice each individual grape. More may be cut at a time if the cook is especially dexterous. In either case, this is a tedious, repetitive process lacking a solution. Thus, it would be a benefit in the art to provide a device where a plurality of foodstuffs may be cut in an expeditious manner.

Thus, a grape cutter solving the aforementioned problems is desired.

SUMMARY OF THE INVENTION

The grape cutter includes a base and a cover overlying the base. The base includes a recess adapted to hold a plurality of foodstuffs therein. The cover also includes a recess adapted to accommodate and hold the foodstuffs between the cover and the base. Both the base and the cover include a respective surrounding flange that define a slicing gap when assembled so that a user may slide a knife through the slicing gap to cut the foodstuffs. The slicing gap may be adjusted to accommodate foodstuffs of various sizes.

These and other features of the present invention will become readily apparent upon further review of the following specification and drawings.

BRIEF DESCRIPTION OF THE DRAWINGS

FIG. 3 is side view of the grape cutter according to the present invention.

Similar reference characters denote corresponding features consistently throughout the attached drawings.

DETAILED DESCRIPTION OF THE PREFERRED EMBODIMENTS

The present invention relates to a grape cutter, generally referred to by reference number 10, that is configured for safe and convenient slicing of a plurality of grapes in a single pass or stroke of a knife K. Although the following description makes specific reference to grapes, it will be understood that the grape cutter 10 may be used for halving a variety foodstuffs of a wide range of sizes.

Figure 1:
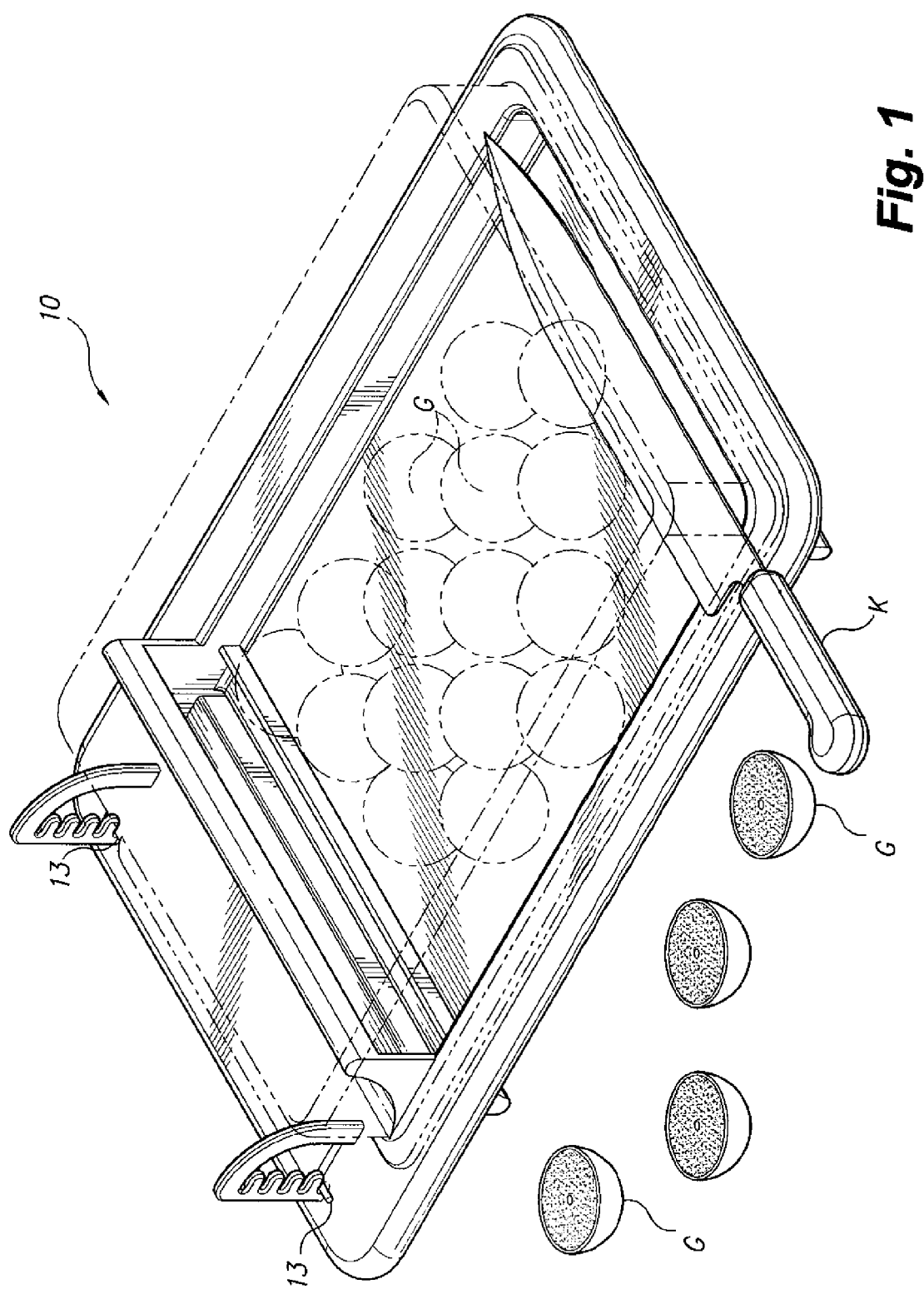
FIG. 1 is an environmental, perspective view of a grape cutter according to the present invention.
Figure 2:
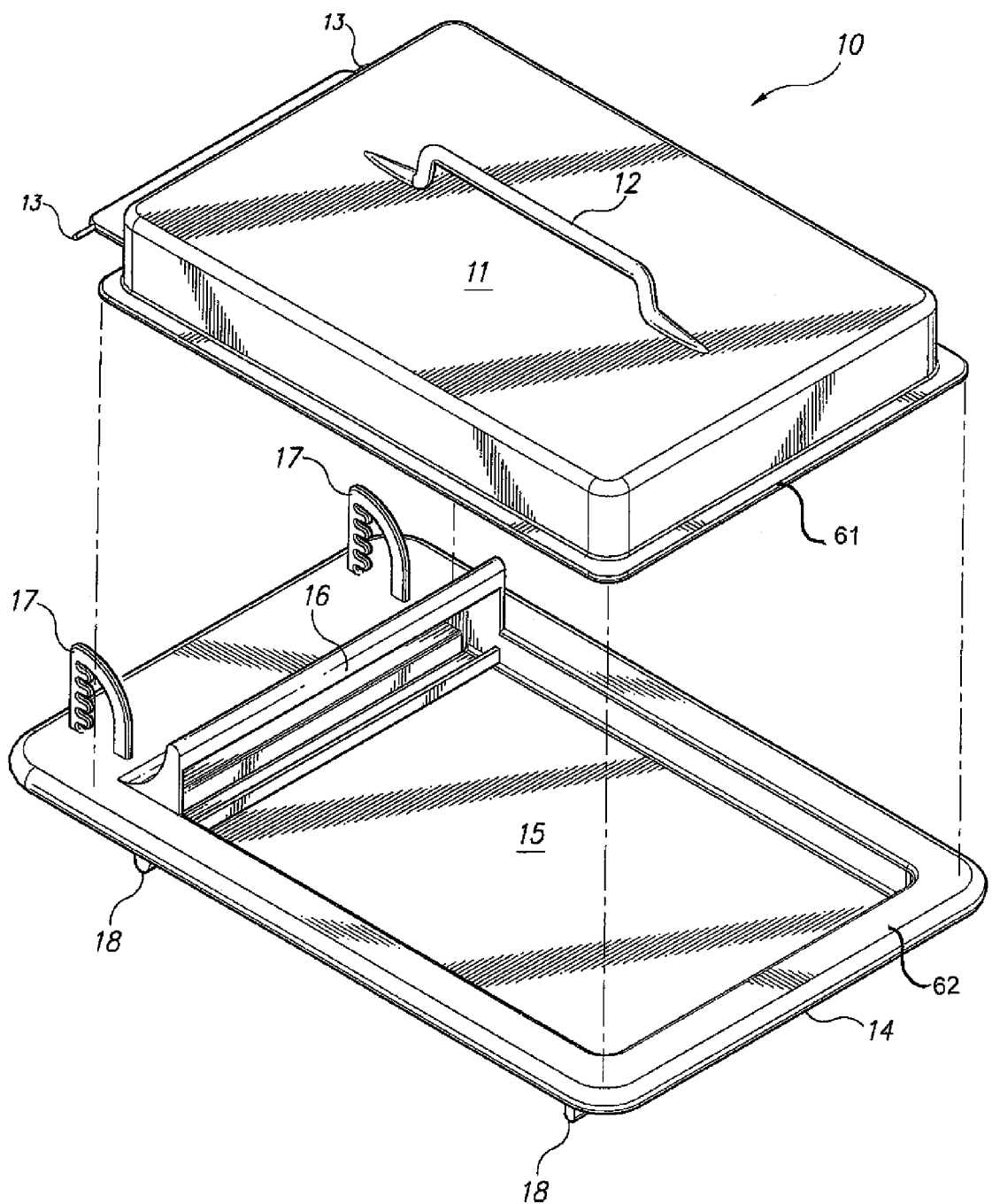
FIG. 2 is an exploded view of the grape cutter according to the present invention.

As shown in FIGS. 1-3, the grape cutter includes a base or base pan 14 and an adjustably mounted top, cover or cover pan 11. The base 14 may be a substantially rectangular, pan shaped structure including a recess or depression 15 for holding a plurality of grapes G or foodstuffs therein. At least a pair of feet or rests 18 are disposed at the bottom of the base 14 to ensure stable operation during cutting or slicing of the grapes. The feet 18 may be elongate protrusions integrally formed with the base 14, or separate elements from the base 14. The feet 18 may also include friction-enhancing strips for further stability. An outwardly extending flange 62 surrounds the recess 15 to define part of a knife gap or slot, the details of which will be further explained below.

The cover 11 may be a substantially rectangular pan-shaped structure including a recess or depression 19 for covering the grapes G protruding upwardly from the bottom of the base 14. The top of the cover 11 may include a handle 12 for easy portability and handling. An outwardly extending flange 61 surrounds the outer edge of the recess 19 to define the other part of the knife gap or slot previously mentioned. Thus, when the cover 11 overlies the base 14, the respective flanges (61, 62) define the knife gap through which the knife K may slide to slice the grapes G contained therebetween. Besides the protective covering afforded by the cover 11, the cover 11 also serves as a means of holding the foodstuffs down during the cutting/slicing operation.

In addition to the above, the grape cutter 10 includes features that increase the versatility and safety of the device. As an example, the base 14 may have a knife stop or abutment 16 protruding upwardly from one end of the recess 15. The knife stop 16 prevents the knife K from sliding or traveling further than the extreme end for slicing all the foodstuffs contained within the base 14. Since not all foodstuffs are of the same size, the cover 11 may be adjustably mounted to the base 14 to accommodate foodstuffs of different sizes. To facilitate adjustable mounting, one end of the base 14 includes a pair of spaced apart adjustment racks 17 extending upwardly from the flange. Each adjustment rack 17 includes a plurality of notches where respective adjustment pegs 13 from the cover 11 may seat, the adjustment pegs 13 oppositely extending from the flange at the respective end of the cover 11. As shown in FIG. 2, while the cover 11 has a flange surrounding or encircling the walls defining the recess in the cover 11, a portion of the rearward edge of the flange having a width less than the spacing between the racks 17 projects or extends rearwardly, the pegs 13 extending laterally from the projecting portion of the flange so that the pegs 13 may seat in a selected pair of the notches. Thus, the vertical placement of the cover 11 may be adjusted by seating the pegs 13 in the desired notches on the racks 17.

The following describes how to use the grape cutter 10. Once the base 14 is firmly placed on a counter or work surface, grapes G or other foodstuffs to be cut are placed inside the recess 15. The cover 11 is adjustably mounted to the base 14 to accommodate the size of the foodstuffs contained in the base 14. The user then presses down on the cover 11 via the handle 12 or the top surface with one hand to prevent the foodstuffs from moving during the cutting operation. The other hand of the user is used to slide the knife K into the gap between the base 14 and the cover 11 from one end to the other until reaching the knife stop 16 to thereby halve the foodstuffs within the grape cutter 10.

Figure 4A:
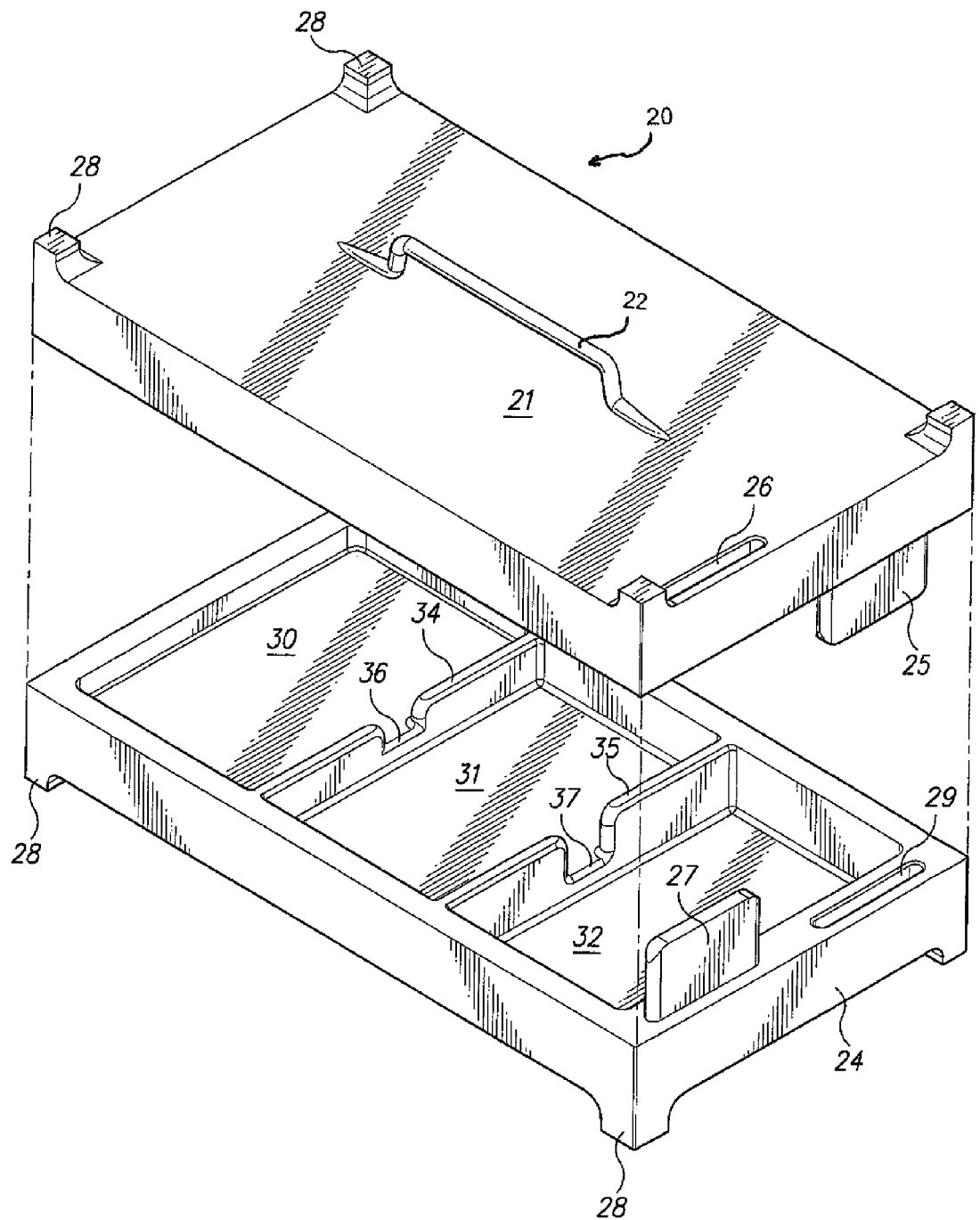
FIG. 4A is a perspective view of an alternative embodiment of a grape cutter according to the present invention.

Having described one aspect of the grape cutter 10, it is noted that the grape cutter 10 may include a variety of alternative configurations. For example, as shown in FIG. 4A, the alternative grape cutter 20 include a cover 21 adapted to overlie a base 24. Both the cover 21 and the base 24 may be substantially similar in construction. As such, both include a plurality of feet or rests 28 providing a stable platform for placing them on a work surface and either can serve as a base. The cover 21 may also include a handle 22.

To adjustably mount the cover 21 to the base 24, the grape cutter 20 includes a sliding mount mechanism, which allows for relatively free vertical adjustment of the cover 21. In that regard, one end of the cover 21 includes a depending mounting tongue 25 adjacent a mounting slot 26. The corresponding end of the base 24 includes an upwardly extending mounting tongue 27 adjacent a mounting slot 29. To mount the two parts, the mounting tongue 25 is inserted into mounting slot 29, which concurrently permits mounting tongue 27 to slide into mounting slot 26. As with the grape cutter 10, the gap between the cover 21 and the base 24 defines a knife gap, and the tongues 25, 27 may also serve as a knife stop.

The grape cutter 20 also includes features for accommodating several foodstuffs of different sizes simultaneously. In that regard, the base 24 includes a recess or depression separated into compartments 30, 31, 32 by dividers 34, 35. As shown in FIG. 4A, the depth of each compartment 30, 31, 32 is different. For example, compartment 30 has the smallest depth, compartment 31 has an intermediate depth, and compartment 32 has the deepest depth corresponding to foodstuffs of respective varying height. In addition, each divider 34, 35 includes respective drainage notches 36, 37 to permit liquids or juices to flow into compartment 32.

Figure 4B:
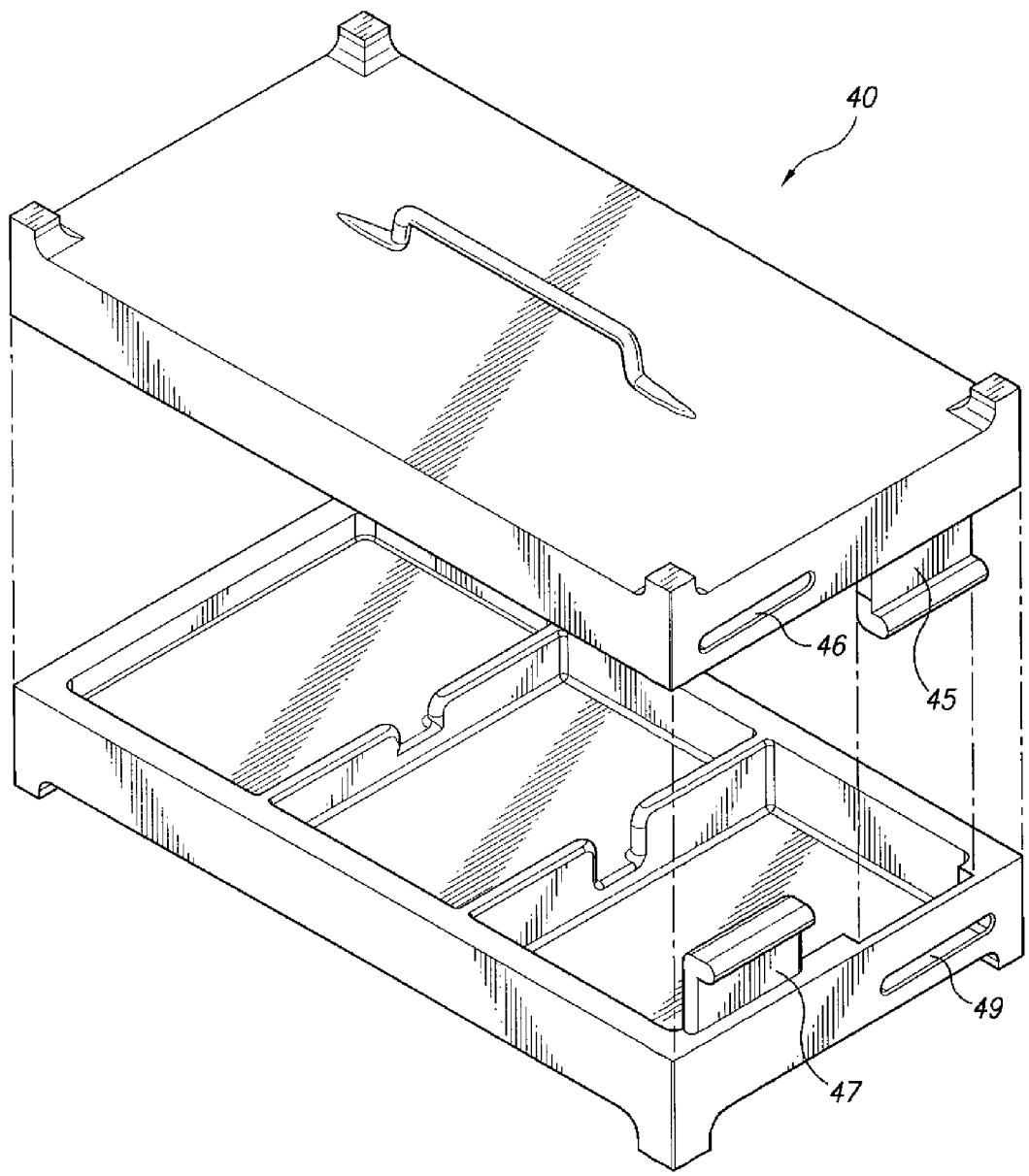
FIG. 4B is a perspective view of an alternative configuration of the grape cutter of FIG. 4A.

Turning to FIG. 4B, this drawing discloses a variation of the grape cutter 20. The grape cutter 40 includes all the features of grape cutter 20 except for the mounting mechanism. The mounting mechanism of grape cutter 40 is more suitable for fixing the knife gap with limited adjustability. In that regard, the mounting mechanism includes a depending locking, mounting tongue 45 adjacent a mounting slot 46 at one end of the cover, and a corresponding end of the base includes an upwardly extending locking, mounting tongue 47 adjacent a mounting slot 49. Unlike grape cutter 20, each mounting slot 46, 49 opens to the side edge rather than the top or bottom. Each tongue 45, 47 includes a transverse protrusion that snaps into the respective slot 49, 46. As with the grape cutter 20, the tongues 45, 49 may also serve as a knife stop.

Figure 5:
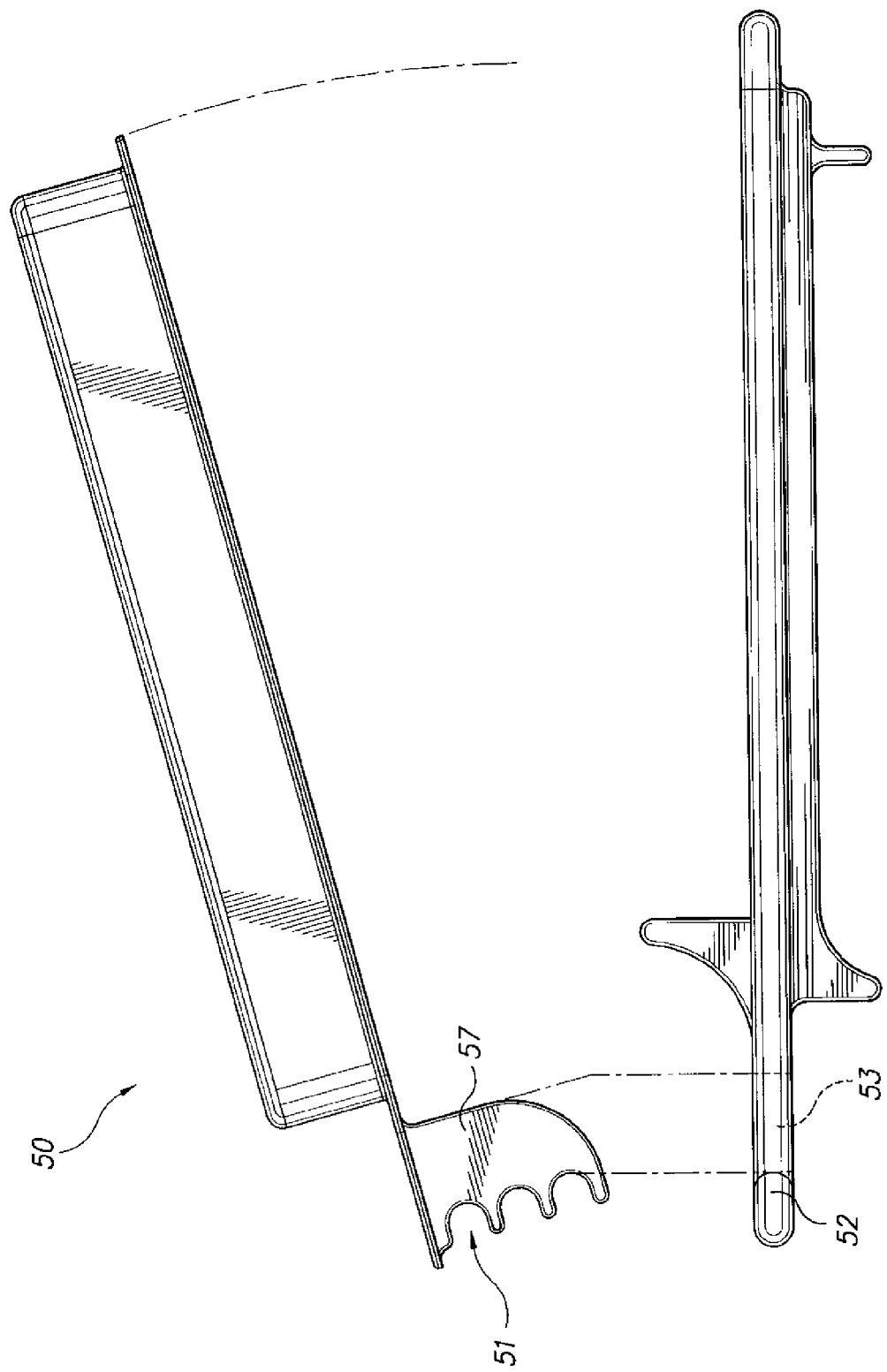
FIG. 5 is a side view of a further alternative embodiment of a grape cutter according to the present invention.

Another alternative grape cutter 50 is shown in FIG. 5. In this embodiment, the grape cutter 50 is substantially similar to grape cutter 10 except for the adjustable mounting mechanism. Instead of the base having an adjustment rack, the cover includes spaced apart adjustment mounting racks 57 depending from one end of the cover. Each rack 57 includes a plurality of notches 51 adapted to seat into a mounting bar portion 52 defined by a gap 53 formed in the flange of the base.

It is noted that the grape cutter 10, 20, 50 encompasses a variety of alternatives inclusive of those mentioned above. For example, the grape cutter 10, 20, 50 is preferably made from durable plastic, but other materials such as wood, steel and/or composites are equally viable. The grape cutter 10, 20, 50 may also includes a variety colors and/or indicia for marketing, advertising, instructions and/or personal messaging.

It is to be understood that the present invention is not limited to the embodiments described above, but encompasses any and all embodiments within the scope of the following claims.

I claim:

1. A grape cutter, comprising:
   a base having an enclosed recess for holding a plurality of foodstuffs;
   a selectively mountable cover having an enclosed recess to cover an upper portion of the foodstuffs, the cover being adapted for mounting over the base and pressing the foodstuffs within the base, the cover and the base defining a slicing gap therebetween, the slicing gap permitting passage of a knife for a slicing operation;
   a height adjustment assembly for adjusting relative height between the base and the cover in order to accommodate foodstuffs of various sizes and to set height of the slicing gap, the height adjustment assembly being disposed at one end of the base and cover; and
   a knife stop formed in the enclosed recess of the base at the height adjustment assembly end of the base, the knife stop preventing further movement of the knife during the slicing operation, the knife stop being adjacent the height adjustment assembly;
   whereby the plurality of foodstuffs is sliced into sections in a single pass of the knife while being held down by the cover;
   wherein said cover and said base each comprises an outwardly extending flange surrounding the recess thereof;
   wherein the height adjustment assembly comprises:
      at least one rack disposed on the flange surrounding said base, the at least one rack having a plurality of inwardly projecting teeth defining user-selectable notches between adjacent teeth; and
      at least one mounting bar disposed on a projecting portion of the flange surrounding said cover, said at least one mounting bar being removably supported on one of the user-selectable notches to accommodate foodstuffs of various sizes between said cover and said base, and to set said the height of the slicing gap.

2. The grape cutter according to claim 1, further comprising a handle disposed on top of said cover.

3. The grape cutter according to claim 1, further comprising at least a pair of feet disposed below said base to stably support said base on a support surface.

4. A grape cutter, comprising:
   a base having an enclosed recess for holding a plurality of foodstuffs;
   a selectively mountable cover having an enclosed recess to cover an upper portion of the foodstuffs, the cover being adapted for mounting over the base and pressing the foodstuffs within the base, the cover and the base defining a slicing gap therebetween, the slicing gap permitting passage of a knife for a slicing operation;
   a height adjustment assembly for adjusting relative height between the base and the cover in order to accommodate foodstuffs of various sizes and to set height of the slicing gap, the height adjustment assembly being disposed at one end of the base and cover; and a knife stop formed in the enclosed recess of the base at the height adjustment assembly end of the base, the knife stop preventing further movement of the knife during the slicing operation, the knife stop being adjacent the height adjustment assembly;

whereby the plurality of foodstuffs is sliced into sections in a single pass of the knife while being held down by the cover;

wherein said cover and said base each comprises an outwardly extending flange surrounding the recess thereof;

wherein the flange surrounding said cover has a projecting portion, said height adjustment assembly comprising:

a pair of spaced apart racks mounted on the flange surrounding said base, each of the racks having a plurality of inwardly projecting teeth defining notches between adjacent teeth, opposing pairs of notches in the racks being aligned with each other to form aligned pairs of notches at different heights; and a pair of pegs extending laterally outward from the projecting portion of the flange surrounding said cover, the projecting portion of the flange having a width slightly less than the spacing between the racks, the pegs being removably seated on one of the pairs of aligned notches to accommodate foodstuffs of various sizes between said cover and said base, and to set said the height of the slicing gap.

5. A grape cutter, comprising:

a base having an enclosed recess for holding a plurality of foodstuffs;

a selectively mountable cover having an enclosed recess to cover an upper portion of the foodstuffs, the cover being adapted for mounting over the base and pressing the foodstuffs within the base, the cover and the base defining a slicing gap therebetween, the slicing gap permitting passage of a knife for a slicing operation;

a height adjustment assembly for adjusting relative height between the base and the cover in order to accommodate foodstuffs of various sizes and to set height of the slicing gap, the height adjustment assembly being disposed at one end of the base and cover; and a knife stop formed in the enclosed recess of the base at the height adjustment assembly end of the base, the knife stop preventing further movement of the knife during the slicing operation, the knife stop being adjacent the height adjustment assembly;

whereby the plurality of foodstuffs is sliced into sections in a single pass of the knife while being held down by the cover;

wherein said cover and said base each comprises an outwardly extending flange surrounding the recess thereof;

wherein the height adjustment assembly comprises:

at least one rack extending from the flange at one end of said cover, the at least one rack having a plurality of outwardly projecting, spaced apart teeth defining notches between adjacent teeth; and at least one mounting slot formed in the flange at one end of said base, the at least one mounting slot defining a mounting bar, the at least one rack being insertable into the slot, a notch in the rack seating on the bar to set the relative height between said cover and said base and the height of the slicing gap.

\* \* \* \* \*